No. 661,149.  
Patented Nov. 6, 1900.
F. W. MALLERY.
ANTIRATTLER THILL COUPLING.
(Application filed July 23, 1900.)
(No Model.)
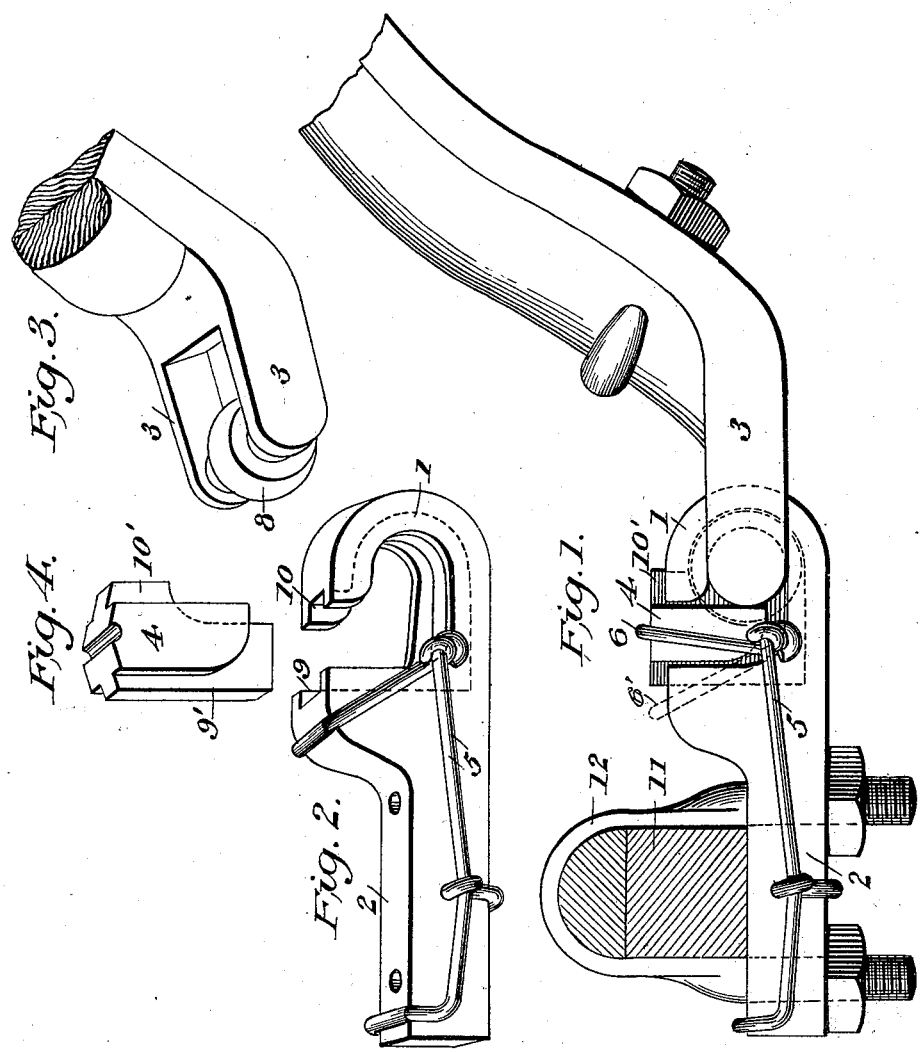
Witnesses:  
Frank Taggart,  
J. E. Applebaugh
Inventor:  
Frank W. Mallery,  
Per H. B. Swartz Atty.
THE NORRIS PETERS CO., PHOTO-LITHO., WASHINGTON, D. C.

UNITED STATES PATENT OFFICE.

FRANK W. MALLERY, OF OVERTON, OHIO, ASSIGNOR OF ONE-HALF TO JAMES T. SMITH, OF SAME PLACE.

ANTIRATTLER THILL-COUPLING.

SPECIFICATION forming part of Letters Patent No. 661,149, dated November 6, 1900.

Application filed July 23, 1900. Serial No. 24,601. (No model.)

*To all whom it may concern:*

Be it known that I, FRANK W. MALLERY, a citizen of the United States, residing at Overton P. O., in the county of Wayne and State of Ohio, have invented a new and useful Antirattler Thill-Coupling, of which the following is a specification.

My invention relates to thill-couplings for vehicles, and particularly to the class known as "antirattler," intended to prevent rattling at the junction of the shaft and axle.

It consists of the novel devices and combination of parts hereinafter fully set forth and described, and is illustrated by the accompanying drawings, in which similar figures of reference indicate like parts.

Referring to the drawings, Figure 1 is a side view of my antirattler thill-coupling. Fig. 2 is a view of one member of same, which for convenience I call the "hook," detached. Fig. 3 is a view of one of my tail-irons for the shafts of a vehicle, detached. Fig. 4 is a view of the wedge-block, such as I use, detached.

In the drawings, 1 is the hook of my improved coupler, and 2 is the shank, whereby it is secured to the axle 11, by means of clip 12, in the usual way. This hook is turned upwardly and rearwardly, so that its terminus stands opposite a corresponding raised portion adjoining the shank and is provided with a furrow along its inner surface 10 and connects with a vertical furrow 9 along the inner surface of said raised portion. It is also provided with a spring 5, made, preferably, of spring-wire and secured to the shank 2. The outer ends of the spring on both sides of the hook-opening are hinged to a saddle 6, made of like wire. The connection and arrangement of the spring and saddle on both sides are made alike. The tail-irons of the shafts, Fig. 3, are bifurcated, and at the outer ends of the extensions 3 3 is set a circular cross-bar 8, made pulley-shaped to enter the grooves 9 10 of the hook-opening and to rest within the same, as shown in Fig. 1. A wedge-block 4, Fig. 4, is constructed to enter the opening of the hook vertically. It is provided with flanges 9' 10', and one side cut away to rest over and upon the upper rear portion of the cross-bar 8. The flanges enter the corresponding grooves 9 10 of the hook. A groove across its top receives the saddle of the spring 6, whereby it is securely held in position against the pulley-shaped cross-bar, and thereby acts as a wedge to tighten the coacting parts of the coupling, secures the tail-irons of the shafts, accommodates itself automatically to wear of the joint, and prevents rattling. By moving the saddle of the spring backward, as shown at 6', the wedge block may be removed and the shafts detached from the hook at pleasure.

I do not limit myself to the particular shape of the several parts as shown, nor to the particular manner of attaching the spring to the shank of the hook, and the same may be modified to suit different kinds of vehicles.

Having thus fully described my invention, what I claim is—

1. A thill-coupling, comprising in its construction a hook terminus upon a shank, a raised portion opposite the hook, with vertical opening between the terminus of the hook and said raised portion, and both furrowed out along their inner and adjacent surfaces; shaft tail-irons made with bifurcations and a circular cross-bar uniting the opposite ends of the bifurcations—said cross-bar fitted to enter the furrows of the hook; and wedge-block having flanges to enter the opening of the hook vertically along the opposite grooves thereof, and a spring-clip attached to the shank of the hook to removably secure the said block in position by a constant pressure, substantially as set forth and for the purpose specified.

2. In a thill-coupling, the combination with a hook attachment, said hook turned rearwardly opposite a corresponding raised portion—said hook and raised portion furrowed along their inner and adjacent edges or faces; of a tailpiece for the shaft of a vehicle constructed with a round cross-bar, centrally enlarged, and solidly secured between the opposite forks of said tailpiece, said enlarged central portion fitted to enter and bear against the forward and bottom portions of said furrow in the shackle; and a block having flanges fitted to enter said grooves vertically and bear against the cross-bar of said tailpiece by means of a spring-fastener removably pressing upon said block, substantially as set forth and for the purpose specified.

In witness whereof I hereunto set my hand, this 14th day of June, 1900, in presence of two witnesses.

FRANK W. MALLERY.

Witnesses:
 HIRAM B. SWARTZ,
 JAMES TILDEN.